(12) United States Patent
Leiter

(10) Patent No.: US 7,900,395 B2
(45) Date of Patent: Mar. 8, 2011

(54) LANDSCAPE EDGING WITH IMPROVED MULCH CONTAINMENT AND IMPROVED DRAINAGE

(76) Inventor: Gary Alan Leiter, Blanchard, OK (US)

(*) Notice: Subject to any disclaimer, the term of this patent is extended or adjusted under 35 U.S.C. 154(b) by 502 days.

(21) Appl. No.: 12/017,240

(22) Filed: Jan. 21, 2008

(65) Prior Publication Data

US 2009/0183426 A1  Jul. 23, 2009

(51) Int. Cl.
*A01G 1/08* (2006.01)
(52) U.S. Cl. .............................. 47/33; 52/102
(58) Field of Classification Search .......... 47/33; 52/102
See application file for complete search history.

(56) References Cited

U.S. PATENT DOCUMENTS

| | | | | |
|---|---|---|---|---|
| 533,130 | A * | 1/1895 | Kingsley | 404/3 |
| 2,713,751 | A * | 7/1955 | Hendrixson | 47/33 |
| 3,037,433 | A * | 6/1962 | Maher | 404/7 |
| 3,485,449 | A * | 12/1969 | Wilson | 239/201 |
| 3,545,127 | A * | 12/1970 | Jensen | 47/33 |
| 3,872,195 | A * | 3/1975 | Stegmeier | 264/35 |
| 4,321,769 | A * | 3/1982 | Tisbo et al. | 47/33 |
| 4,335,474 | A * | 6/1982 | Bailey | 4/506 |
| 4,934,093 | A | 6/1990 | Yanna | |
| 4,976,063 | A | 12/1990 | Young | |
| 5,092,076 | A | 3/1992 | Terreta | |
| 5,117,583 | A * | 6/1992 | Reum | 47/33 |
| 5,134,819 | A * | 8/1992 | Boyack | 52/169.7 |
| 5,377,447 | A | 1/1995 | Fritch | |
| 5,379,546 | A | 1/1995 | Popp | |
| 5,438,804 | A | 8/1995 | Reum et al. | |
| 5,640,801 | A | 6/1997 | Rynberk | |
| 5,930,947 | A | 8/1999 | Eckhoff | |
| 6,336,290 | B1 * | 1/2002 | Callan | 47/33 |
| 6,625,925 | B1 | 9/2003 | Foster | |
| 2003/0084619 | A1 * | 5/2003 | Smith | 52/102 |
| 2006/0277823 | A1 * | 12/2006 | Barnett et al. | 47/33 |

FOREIGN PATENT DOCUMENTS

| | | | | |
|---|---|---|---|---|
| DE | 4236529 | A1 * | 5/1994 | |
| JP | 07255277 | A * | 10/1995 | |
| JP | 09009780 | A * | 1/1997 | |
| JP | 11247209 | A * | 9/1999 | |

* cited by examiner

*Primary Examiner* — Son T. Nguyen
(74) *Attorney, Agent, or Firm* — Martin A. Weeks

(57) ABSTRACT

The invention is for landscape edging with improved mulch containment and improved drainage. The landscape edging has a substantially vertical planar surface adjacent to a substantially horizontal surface. The vertical planar surface and the horizontal planar surface are adhered to a sidewalk or pavement that borders a flower bed or garden. A riser extends upward from a first end of the horizontal surface. A lip surface extends from the riser in a direction away from the horizontal planar surface. A curved canopy surface extends from the lip, back over the lip and the horizontal surface, until it intersects with a flower bed wall. The flower bed wall it is a curved surface that extends between a second end of the horizontal planar surface and the canopy surface. The flower bed wall has orifices disposed therein to allow water from the flower bed to enter the landscape edging.

10 Claims, 2 Drawing Sheets

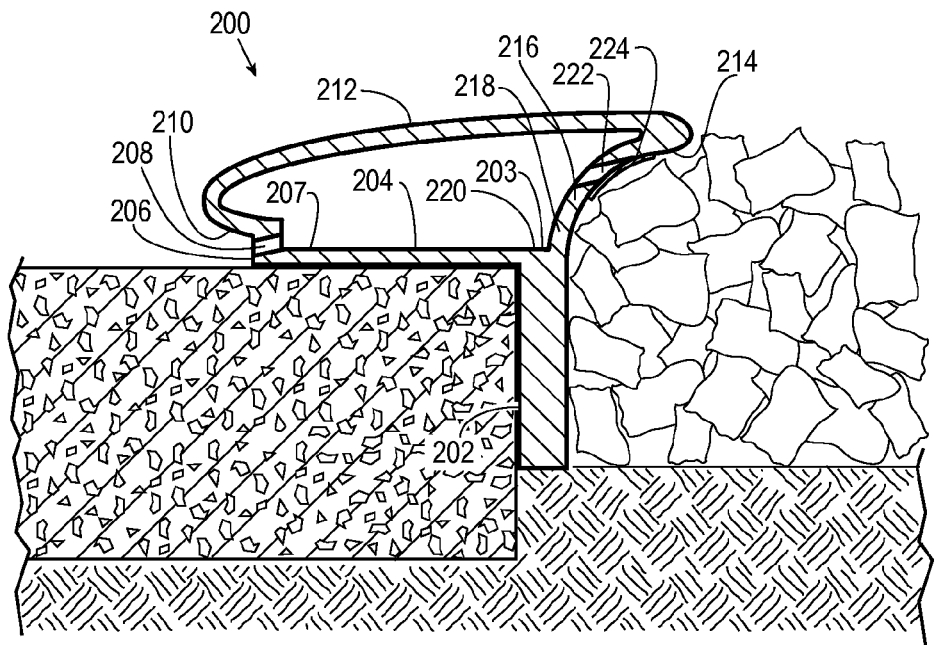
*Fig. 4*
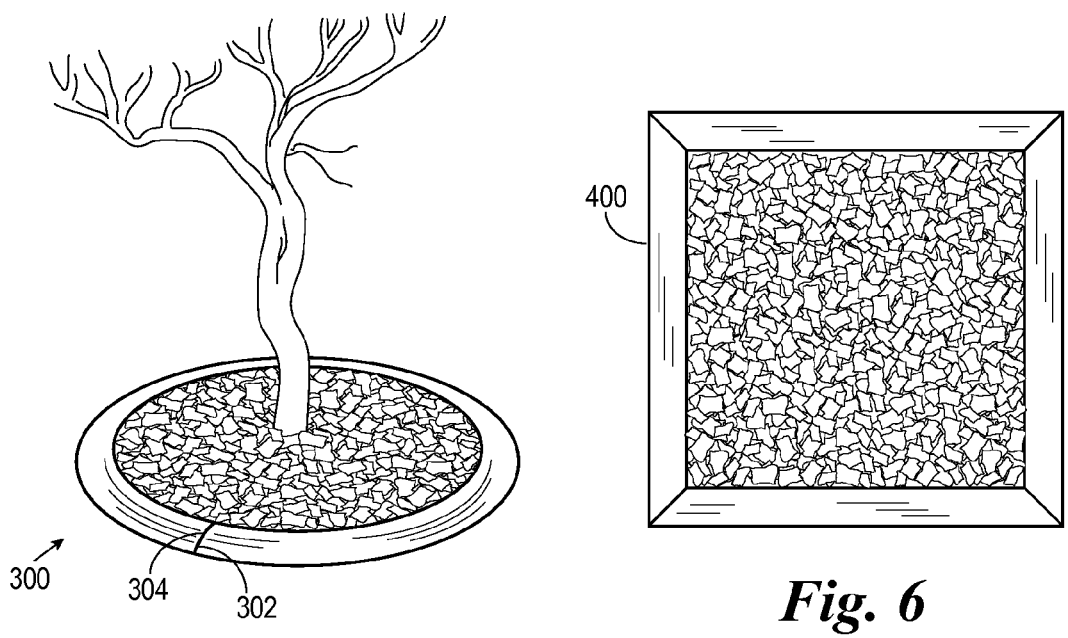
*Fig. 5*
*Fig. 6*

LANDSCAPE EDGING WITH IMPROVED MULCH CONTAINMENT AND IMPROVED DRAINAGE

CROSS-REFERENCE TO RELATED APPLICATIONS

None.

BACKGROUND OF THE INVENTION

1. Field of the Invention

The invention relates generally to landscape borders and more specifically to landscape edging with improved containment of the mulch and improved drainage.

2. Description of the Related Art

People have created borders around flower beds and gardens for centuries for aesthetic reasons. Separating a flower bed from a lawn with landscape edging provides a pleasant sense of order to people viewing the lawn and flower bed. More importantly, people have used landscape edging to contain wood chips, gravel, bark, and decorative rocks (collectively referred to herein as mulch) because the mulch helps to promote the growth of plants in the flower beds. However, many landscape edging designs of the existing art do not contain the mulch inside the flower bed and allow the mulch to "leak out" of the flower bed after the initial installation. This mulch leakage occurs because: (1) the seams of the landscape edging do not form a proper seal to contain the mulch; (2) the landscape edging is not adequately anchored with respect to the ground; and/or (3) the landscape edging is not wide enough to properly contain the mulch.

Another problem for landscape borders of the existing art is that, while many of the devices used for a flower bed or garden border in the past have provided a decorative function, these devices have also acted as water dams that prevent proper drainage from the flower bed or garden. Plants in a flower bed need a substantial flow of water through the soil in which the plants are planted in order to thrive. Furthermore, water retention in mulch or soil surrounding the plants may promote the growth of harmful fungi and bacteria, in addition to attracting mosquitoes. It is to solving these and other problems that the present invention is directed.

BRIEF SUMMARY OF THE INVENTION

The invention is for landscape edging with improved mulch containment and improved drainage. The landscape edging has a substantially vertical planar surface adjacent to a substantially horizontal surface. The vertical planar surface and the horizontal planar surface engage a sidewalk or pavement that borders a flower bed or garden. A riser extends upward from a first end of the horizontal surface. A lip surface extends from the riser in a direction away from the horizontal planar surface. Drainage holes or orifices are defined in the riser. The lip surface has a sufficient width that persons standing near the landscape edging cannot ordinarily see the drainage holes or orifices in the riser.

A curved canopy surface extends from the lip surface, back over the lip surface and the horizontal surface, until it intersects with a flower bed wall. The flower bed wall is a curved surface that extends between a second end of the horizontal planar surface and the canopy surface. The flower bed wall has orifices disposed therein to allow water from the flower bed to enter the landscape edging. Screens may be used over the orifices to prevent particulates from entering the landscape edging.

BRIEF DESCRIPTION OF THE DRAWINGS

FIG. 4 is a cross-sectional view of a landscape edging in accordance with another embodiment of the present invention.

FIG. 5 is a perspective view of landscape edging of the present invention installed in a circle around a flower bed.

FIG. 6 is a perspective view of landscape edging of the present invention installed in a rectangular fashion around a flower bed.

DESCRIPTION

Figure 1:
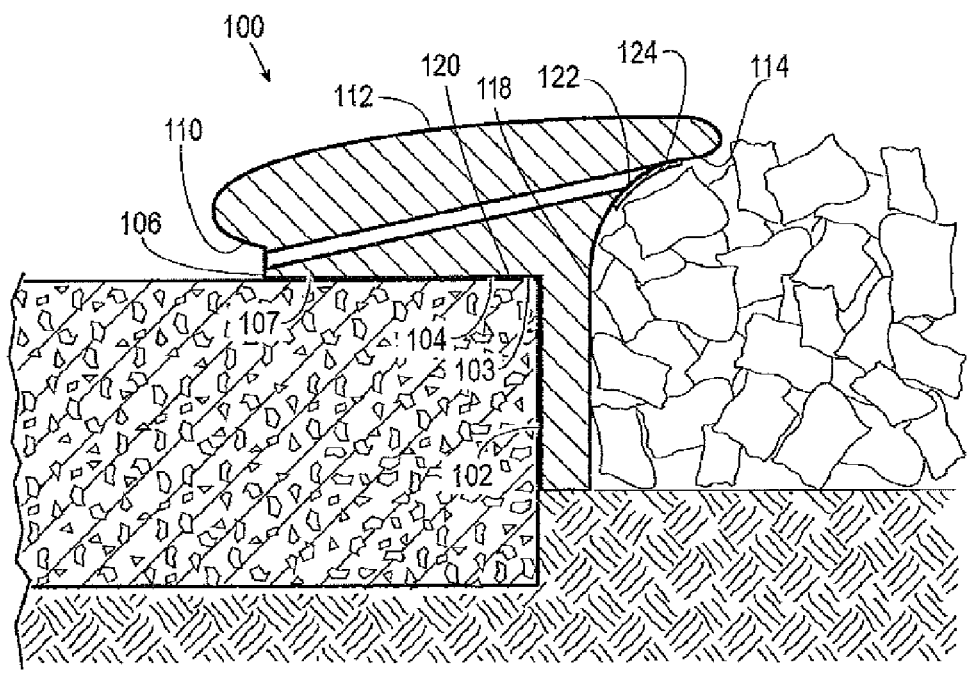
FIG. 1 is a cross-sectional view of a landscape edging in accordance with an embodiment of the present invention.
Figure 2:
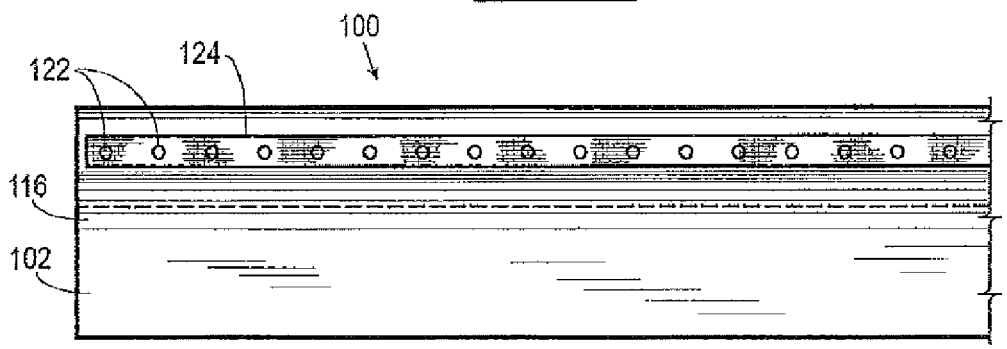
FIG. 2 is a front elevation view of a length of landscape edging in accordance with an embodiment of the present invention.
Figure 3:
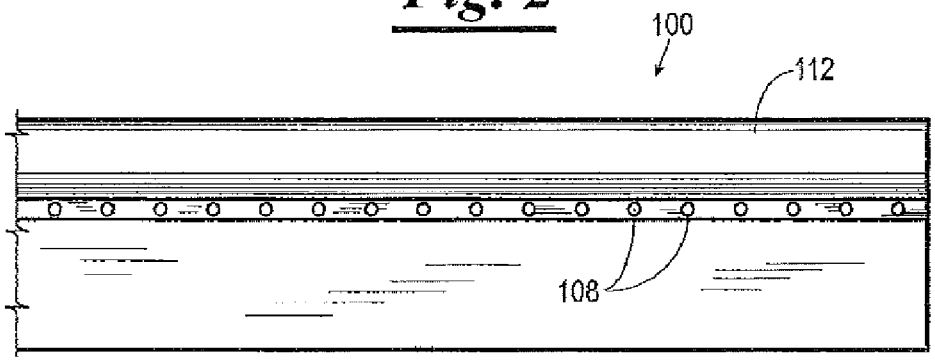
FIG. 3 is a rear elevation view of a length of landscape edging in accordance with an embodiment of the present invention.

FIGS. 1-3 show an embodiment of a length or segment of landscape edging 100 of the present invention. In FIGS. 1-3, the landscape edging 100 has a substantially vertical planar surface 102 adjacent to a substantially horizontal planar surface 104. The vertical planar surface 102 and the horizontal planar surface 104 are perpendicular to one another and engage a pavement or sidewalk that borders a flower bed. The vertical planar surface 102 and the horizontal planar surface 104 are secured to the pavement, preferably by glue, an adhesive, a cohesive, or an epoxy. The pavement may be concrete, rock or another appropriate material to which the landscape edging 100 may be adhered. A riser surface 106 extends upward from a second end 107 of the horizontal planar surface 104, while the vertical planar surface 102 is attached to a bottom of a first end 103 of the horizontal planar surface 104.

A lip surface 110 extends generally horizontally from the riser surface 106 in a direction away from the horizontal planar surface 104. A width of the lip surface 110 should be sufficient that an adult person standing within five feet of the landscape edging 100 is not able to see the drainage holes 108. A curved canopy surface 112 extends from the lip surface 110, extends over the lip surface 110 and the horizontal planar surface 104, until the canopy surface 112 intersects with an upper end 114 of a flower bed wall 116. A lower end 118 of the flower bed wall 116 is integrally formed with a top 120 of the horizontal planar surface 104. Cylindrical orifices 122 are located in the flower bed wall upper end 114 and extend to the riser surface 106 to permit water to enter the orifices 122 and drain beneath the lip surface 110. Screens 124 may be used over the orifices 122 to prevent particulates from entering the landscape edging 100.

The flower bed wall 116 is curved such that it is substantially vertical at the lower end 118 thereof and it is near-horizontal at the upper end 114 thereof. The term near-horizontal is defined to mean any angle that is between thirty degrees and zero with respect to a horizontal plane. Similarly, the canopy surface 112 is curved from a substantially vertical position near the lip surface 110 to a near-horizontal position near the flower bed wall 116. As such, the landscape edging 100 will tend to retain the mulch when any scattering forces are exerted on the mulch. If the mulch builds up so that the mulch is near or overflowing the flower bed wall upper end 114, a landscaper should remove some of the mulch in the flower bed.

The landscape edging 100 absorbs water from the mulch into the orifices 122 because the water in the mulch has a hydrostatic pressure greater than the air pressure in the orifices 122. The number and sizes of the orifices 122 may be varied based on the porosity and permeability of the mulch. If the mulch is of such a nature that it tends to retain water, it may be desirable for the landscape edging 100 to have more or larger orifices 122 per length of landscape edging 100 than the landscape edging 100 would have if the mulch did not tend to retain water. The orifices 122 provide a passage for pressure communication between the water in the mulch and the ambient air outside the landscape edging 100.

FIG. 4 shows a second embodiment of a landscape edging 200 of the present invention. In FIG. 4, the landscape edging 200 has a substantially vertical planar surface 202 adjacent to a substantially horizontal planar surface 204. The vertical planar surface 202 and the horizontal planar surface 204 are perpendicular to one another and engage a pavement or sidewalk that borders a flower bed. A riser surface 206 extends upward from a second end 207 of the horizontal planar surface 204, while the vertical planar surface 202 is attached to a bottom 205 of a first end 203 of the horizontal planar surface 204. Drainage holes 208 are defined in the riser surface 206.

A lip surface 210 extends from the riser surface 206 in a direction away from the horizontal planar surface 204. A width of the lip surface 210 is sufficient that an adult person standing within five feet of the landscape edging 200 is not able to see the drainage holes 208. A curved canopy surface 212 extends from the lip surface 210, extends over the lip surface 210 and the horizontal planar surface 204, until the canopy surface 212 intersects with an upper end 214 of a flower bed wall 216. A lower end 218 of the flower bed wall 216 attaches to a top 220 of the horizontal planar surface 204 to generally form a closed volume. Orifices 222 located in the flower bed wall upper end 214 permit water to enter the landscape edging 200.

The landscape edging 200 defines a substantially closed volume with passages into the volume provided by the orifices 222 and passages out of the volume provided by the drainage holes 208. Screens 224 may be used over the orifices 222 to prevent particulates from entering the landscape edging 200.

The landscape edging 200 absorbs water from the mulch into the closed volume because the water in the mulch has a hydrostatic pressure greater than the pressure in the closed volume. Initially, when the landscape edging 200 is first installed, the closed volume will have a pressure equal to the ambient air. After flow has developed into the orifices 222 and out the drainage holes 208, it is anticipated that the landscape edging 200 may act to suction the water from the mulch through the orifices 222, into the closed volume and expel water through the drainage holes 208.

In comparing the two embodiments for landscape edging 100 and 200, it is clear that the landscape edging 100 is more amenable to joining by miter cutting ends of two lengths of landscape edging 100, because when ends of the landscape edging 100 are miter cut, there is a much greater surface area displayed to which one may apply a glue, adhesive, cohesive, or an epoxy. Thus, the larger surface area provides a larger bonding surface for the adhesive, cohesive, or epoxy to join the ends of lengths of landscape edging.

FIG. 5 shows a perspective view of a single segment 300 of landscape edging 100 placed in a simple closed curve, such as a circle, about a tree. For the landscape edging shown in FIG. 5, ends 302 and 204 of the segment of landscape edging 300 are joined by an adhesive, an epoxy, or a cohesive.

FIG. 6 shows a perspective view of a four segments 400 of landscape edging 100 that surround a rectangular garden. For this embodiment, the segments 400 are miter cut at their ends and joined by an adhesive, an epoxy, or a cohesive.

The landscape edging 100 may be made of plastic, rubber, sheet metal, steel, copper, aluminum, polyvinyl chloride, polyester or any other appropriate material. In one embodiment, the landscape edging 100 is formed in a mold. In another embodiment, the material that makes up the landscape edging 100 is extruded by first heating the material, forcing the material through a die and defining the orifices 122 and drainage holes 108 with a drill after the material has cooled.

It is to be understood that even though numerous characteristics and advantages of various embodiments of the present invention have been set forth in the foregoing description, together with details of the structure and function of various embodiments of the invention, this description is illustrative only, and changes may be made in the detail within the principles of the present invention to the full extent indicated by the broad general meaning

What is claimed is:

1. A landscape edging for containing mulch in a flower bed, the landscape edging comprising:
    (a) a substantially vertical planar surface adjacent to and connected to a first end of a substantially horizontal planar surface, wherein the vertical planar surface and the horizontal planar surface engage a pavement near the flower bed;
    (b) a riser surface attached to a second end of the horizontal planar surface;
    (c) a lip surface connected to a top end of the riser surface, wherein the lip surface extends in a direction away from the horizontal planar surface;
    (d) a curved canopy surface that extends from the lip surface in a direction toward the horizontal planar surface such that the canopy surface extends over the lip surface, the riser surface, and the horizontal planar surface; and
    (e) a curved flower bed wall, the flower bed wall having a lower end and an upper end, wherein the lower end of the flower bed wall is attached to an upper end of the vertical planar surface, wherein the upper end of the flower bed wall is attached to the canopy surface and wherein the flower bed wall curves from a substantially vertical position at the lower end thereof to a near-horizontal position at the upper end thereof to protrude over the flower bed.

2. The landscape edging of claim 1 wherein the vertical planar surface and the horizontal planar surface are adhered to the pavement by an adhesive, a cohesive, an epoxy or glue.

3. The landscape edging of claim 1 wherein orifices defined in the landscape edging extend from the flower bed wall to the riser surface to drain water from the mulch.

4. The landscape edging of claim 1 wherein screens are secured to the flower bed wall covering the orifices to prevent particulates from entering the orifices.

5. The landscape edging of claim 1 wherein the size and number of the orifices are selected based on the porosity and permeability of the mulch.

6. The landscape edging of claim 1 wherein ends of segments of the landscape edging are miter cut and joined at right angles to surround a flower bed.

7. The landscape edging of claim 1 wherein the landscape edging is made from a flexible material.

8. The landscape edging of claim 7 wherein the landscape edging is made from rubber.

9. The landscape edging of claim 7 wherein a single segment of landscape edging is positioned around the flower bed in a simple closed curve and joined at ends of the segment by an adhesive.

10. The landscape edging of claim 1 wherein the landscape edging is made from a material selected from a group of materials consisting of: plastic, polyvinyl chloride, polyester, aluminum, sheet metal, and steel.

\* \* \* \* \*